Oct. 10, 1933.   L. E. MILKEY   1,930,209
FILTER
Filed June 25, 1931

Inventor:
Lester E. Milkey,
by Lester L. Sargent
Atty.

Patented Oct. 10, 1933

1,930,209

UNITED STATES PATENT OFFICE 1,930,209

FILTER

Lester E. Milkey, Sandusky, Ohio, assignor to The Cellulo Company, Sandusky, Ohio Application June 25, 1931. Serial No. 546,894

9 Claims. (Cl. 210—183)

The object of my invention is to provide a novel, efficient, and simply constructed filter for laboratory and small scale filtering operations, and which will permit "filtermass" to be used as the filtering medium; and to provide a filter which affords an unusually large filtering surface, and by means of which it is possible to produce a very brilliant filtrate.

I obtain these and other objects of my invention by the device illustrated in the accompanying drawing, in which—

Like numerals designate like parts in each of the several views.

Figure 1:
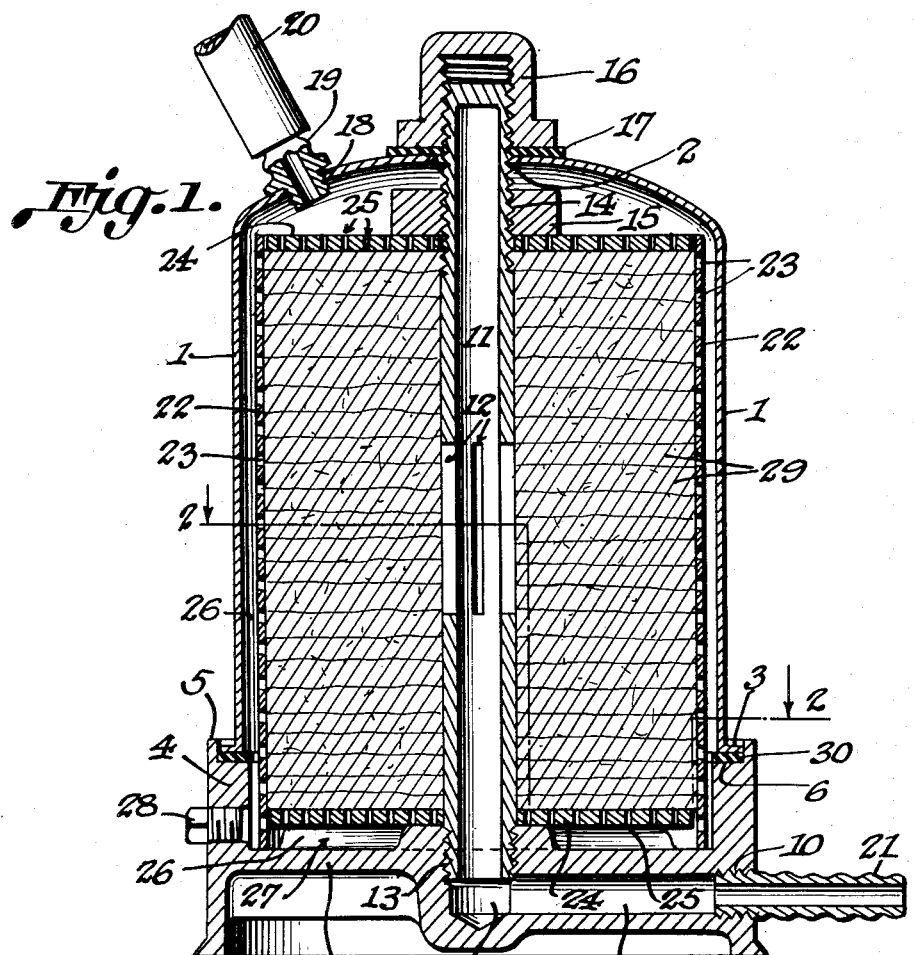
Figure 1 is a vertical section through my filter.
Figures 2, 3:
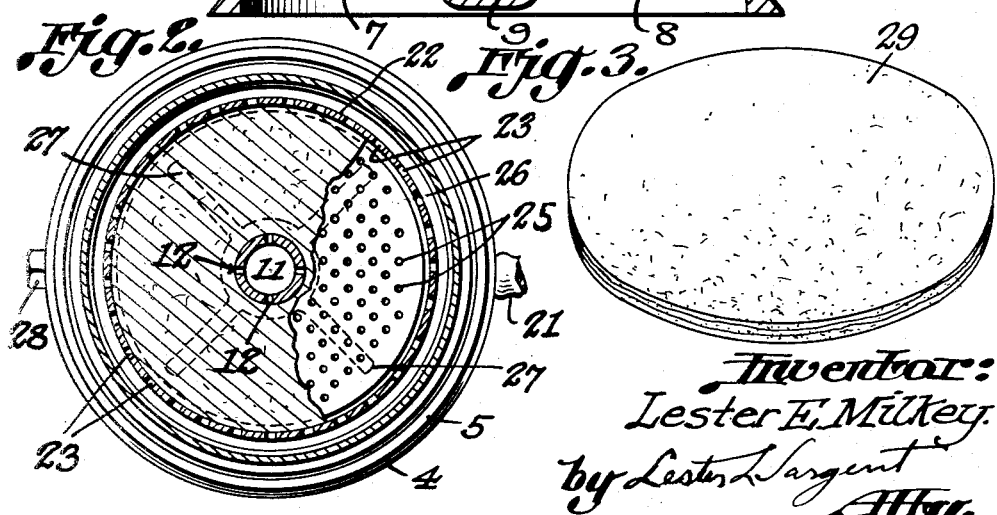
Fig. 2 is a horizontal section on line 2—2 of Fig. 1.
Fig. 3 is a perspective view of a sheet of dry filtermass before being pulped for use as the filtering medium.

Referring to the accompanying drawing, I provide a suitable outer casing 1 having an opening 2 at the top and having an outturned annular flange 3 at the bottom. I provide a supporting base 4 having an annular recess 6 and an annular rim or flange 5. In recess 6 is seated the washer 30 and the annular flange 3 of the casing 1. The base 4 is provided with a floor 7, a central passage 9 and lateral passage 8 and screw-threaded opening 10, a suitable threaded discharge pipe 21 being mounted in the threaded opening 10.

I provide a vertical central filtrate discharge pipe 11 which is provided with vertical slots 12 near its central portion or vertical center, to permit the filtrate to enter the pipe. Pipe 11 has a threaded lower end 13 screw-threaded in the floor 7 of the base 4 and a screw-threaded upper end 14 which projects through opening 2 in the outer casing 1 and on which a screw-threaded cap 16 is seated over a suitable washer 17. I provide a screw-threaded opening 18 in the upper end of outer casing 1 for the screw-threaded end of nozzle 19 which is connected to a suitable inflow pipe 20.

I provide a suitable cylindrical container 22 for the filtering material, this container having a multiplicity of perforations 23. I also provide like top and bottom plates 24 to enclose the filtering material. These plates are provided with a multiplicity of perforations 25 and are of a diameter corresponding with the inside diameter of the perforated cylinder 22, to seat in same as shown in Fig. 1. The floor 7 is provided with radiating ribs 26 which support the bottom plate 24 in a raised position to provide a space 26 therebeneath, there being a similar space 26 intervening between perforated cylinder 22 containing the filtering material and the outer casing 1. I provide a removable screw-threaded plug 28 having a squared head as shown. This plug is mounted in a correspondingly threaded opening in base 4 as shown in Fig. 1, and may be removed to facilitate cleaning the apparatus. Plates 24 are detachable from member 22.

I prefer to provide as the filtering medium, the filtermass 29 which consists of a compressed mass of suitable fibrous pulp made principally of cellulose and asbestos fibers, and which is soaked in water to pulp it up before being packed in the filter.

In use the unfiltered liquid is introduced under pressure through the inflow pipe 20, nozzle 19 and inlet opening 18 at the top of the filter and circulates through the space 26 and percolates through the perforations 23 and 25 of the respective walls 22 and 24 of the inner container. This inner container is packed with the suitable filtering medium which is held in compressed position by the threaded block 15 which engages the threaded upper end 14 of pipe 11 and holds the upper disc 24 which holds in place the top of the inner container. While other filtering mediums may be used, such as various other vegetable or mineral fibers or fuller's earth, I prefer to employ "filtermass" which consists of a mass of fibrous pulp composed principally of cotton and asbestos fibers. This "filtermass" comes in dry form, either in sheets or blocks, and it is then soaked in water and thoroughly pulped into an even, uniform pulpy condition before it is packed into the filter container, thus providing a solid mass of the fibrous pulp in the filter container. After it becomes clogged with solid matter during the filtering operation, it can be taken out and washed and then repacked in the filter again.

By the use of this filter and of the "filtermass" described, unusual results are obtained in the way of very clear filtrate no matter how fine the solid matter in the unfiltered liquid.

My filter permits the use, on a small scale, for the first time, of this "filtermass" which heretofore has required complicated and expensive special equipment for its proper use in large commercial filtering operations.

It will be noted that the vertical slots 12 in pipe 11 are fine enough to prevent the mass itself from going through, and the distance from the outside surface of the mass to the nearest part of the slot in the central pipe is the same all over the filter practically so that the filtering distance is constant which is an important factor.

Another feature of this filter is that the maximum proper filtering pressure is predetermined in the design of the filter and if the pressure is accidently run above that, the outer casing lifts off the gasket and allows leakage. This prevents filtering at higher pressures than are accepted as good practice in filtering and also prevents bursting the filter under too high pressures.

What I claim is:—

1. In a filter, an outer casing, a base, said base including a floor having upstanding radiating ribs, an inner container having a multiplicity of perforations in its top, bottom and cylindrical side walls spaced from the inner container, a filtrate discharge pipe extending centrally from end to end through the aforesaid containers, said pipe having openings approximately at its central portion, a discharge passage in the aforesaid base with which said pipe communicates, and an inflow conduit communicating with the space in the upper end of the outer casing.

2. In a filter, the combination of an outer casing, a base having an annular recess in which the outer casing seats, a smaller perforated container mounted within the outer casing, said perforated container having its top and bottom members loosely mounted in said inner container to facilitate removal, a filtering medium contained within said inner container, a vertical filtrate discharge pipe extending through the outer and inner containers and a discharge conduit opening out of the base member and with which the said vertical pipe communicates for the discharge of the filtrate, and an inlet conduit opening into the upper end of the outer casing for supplying unfiltered liquid under pressure.

3. In a filter, an outer casing having an inlet pipe opening into its upper end and having a central opening, a base having an annular recess in which the outer casing is removably seated, a vertical discharge pipe having a threaded connection in its lower end with the base, the base having a discharge passage communicating with the said vertical pipe, the vertical pipe having a threaded upper end extending through the opening in the top of the outer casing, a threaded cap detachably secured on the upper threaded end of the vertical pipe, a perforated inner container spaced from the outer container and filtering material packed in said perforated container.

4. In combination with the apparatus defined in claim 3, said perforated inner container having its top and bottom members loosely seated in its vertical wall member, and a threaded block mounted on the upper threaded end of the vertical pipe and fastening the top member of the inner container in place over the filtering medium.

5. In combination with the apparatus defined in claim 3, the filtering medium in the inner container comprising a moistened mass of fibrous pulp.

6. In a filter, a cylindrical outer casing, a cylindrical base, said base including a floor having upstanding ribs, an inner container spaced from the outer container, said inner container comprising perforated separable top, bottom, and cylindrical side wall members, a central filtrate discharge pipe extending through the inner and outer containers, a discharge conduit in the floor of the base member in which said pipe communicates, said pipe having a series of vertical slots near its center to permit the filtrate to pass into same, and a threaded cap engaging the upper end of the pipe and thereby releasably securing the outer casing to the base, the pipe also having a threaded lower end secured to the floor of the base member, an inflow pipe opening into the upper end of the outer casing, and filtering material packed in the inner container.

7. In a filter, a cylindrical outer casing, a cylindrical base, said base including a floor having upstanding ribs, an inner container spaced from the outer container, said inner container comprising perforated separable top, bottom, and cylindrical side wall members, a central filtrate discharge pipe extending through the inner and outer containers, a discharge conduit in the floor of the base member in which said pipe communicates, said pipe having a series of vertical slots to permit the filtrate to pass into same, and a threaded cap engaging the upper end of the pipe and thereby releasably securing the outer casing to the base, the pipe also having a threaded lower end secured to the floor of the base member, an inflow pipe opening into the upper end of the outer casing, filtering material packed in the inner container, a threaded block on the threaded upper end of the central pipe and fastening the top plate member of the inner container in place.

8. In a filter, the combination of a base having a discharge conduit extending through the floor thereof and having a threaded central opening communicating with said discharge conduit, an outer casing removably seated on the base, a vertical discharge pipe threaded to the base and extending through and threaded to the upper end of the outer casing, a threaded cap engaging the projecting end of the discharge pipe and securing the outer casing to the base, an inlet conduit opening into the upper end of the outer casing for admitting the liquid to be filtered, a perforated inner container having separable top, bottom and side wall members, the base having ribs supporting the bottom member in spaced relation to the floor of the container, a filtering medium packed in the inner container, a threaded block threaded on the upper end of the central pipe and fastening the top member of the inner container in place on the filtering medium, the vertical pipe having a series of vertical slots to admit the filtered liquid.

9. In a filter, the combination of a base having a discharge conduit extending through the floor thereof and having a threaded central opening communicating with said discharge conduit, an outer casing removably seated on the base, a vertical discharge pipe threaded to the base and extending through the upper end of the outer casing, a threaded cap engaging the projecting end of the discharge pipe and securing outer casing to the base, an inlet conduit opening into the upper end of the outer casing for admitting the liquid to be filtered, a perforated inner container having separable top, bottom and side wall members, the base having ribs supporting the bottom member in spaced relation to the floor of the container, a filtering medium packed in the inner container, a threaded block threaded on the upper end of the central pipe and fastening the top member of the inner container in place on the filtering medium, the vertical pipe having openings through same near its vertical center.

LESTER E. MILKEY.